United States Patent [19]

Maryanka

[11] Patent Number: 5,727,025
[45] Date of Patent: Mar. 10, 1998

[54] VOICE, MUSIC, VIDEO AND DATA TRANSMISSION OVER DIRECT CURRENT WIRES

[75] Inventor: Yair Maryanka, Tel Aviv, Israel

[73] Assignee: Yamar Ltd., Tel Aviv, Israel

[21] Appl. No.: 493,033

[22] Filed: Jun. 21, 1995

Related U.S. Application Data

[63] Continuation-in-part of Ser. No. 185,711, Jan. 24, 1994, abandoned.

[51] Int. Cl.$^6$ .................. H04L 25/00; H04L 27/00
[52] U.S. Cl. ............ 375/257; 375/295; 375/259; 375/316
[58] Field of Search .............. 375/257, 222, 375/216, 259, 85.1, 220, 295, 316; 340/310 R, 310 CP, 310 A, 825.24, 825.25; 333/236; 348/6–10; 455/3.1, 6.3; 379/66, 90, 101; 371/30; 307/10.1, 11, 22, 26

[56] References Cited

U.S. PATENT DOCUMENTS

| | | | |
|---|---|---|---|
| 3,852,740 | 12/1974 | Haymes | 348/538 |
| 3,942,168 | 3/1976 | Whyte | 340/310.1 |
| 3,967,264 | 6/1976 | Whyte et al. | 340/310.08 |
| 4,106,007 | 8/1978 | Johnston et al. | 340/310 A |
| 4,185,106 | 1/1980 | Propp et al. | 375/257 |
| 4,316,179 | 2/1982 | Bliss et al. | 379/40 |
| 4,805,014 | 2/1989 | Sahara et al. | 348/6 |
| 4,835,604 | 5/1989 | Kondo et al. | 348/8 |
| 4,887,152 | 12/1989 | Matsuzaki et al. | 348/8 |
| 4,912,723 | 3/1990 | Verbanets, Jr. | 375/220 |
| 4,935,924 | 6/1990 | Baxter | 348/8 |
| 5,016,272 | 5/1991 | Stubbs et al. | 348/6 |
| 5,051,720 | 9/1991 | Kittirutsunetron | 340/310 R |
| 5,195,098 | 3/1993 | Johnson et al. | 340/310 R |

FOREIGN PATENT DOCUMENTS 300686  12/1988  Japan.

OTHER PUBLICATIONS

McGraw-Hill Dictionary of Scientific and Technical Terms, 2nd Ed., p. 257.

*Primary Examiner*—Tesfaldet Bocure
*Attorney, Agent, or Firm*—Mark M. Friedman

[57] ABSTRACT

An apparatus for the transmission of information along a noisy DC power line. The apparatus includes one or more interface modules, each of which provides an interface for receiving a high bit-rate digital information signal corresponding to a human voice, music, or a video. The apparatus further includes a channel coder connected to the interface modules for processing the high bit-rate digital information signals to produce a verifiable digital signal which includes information for performance of an error correction to compensate for background noise. The apparatus also includes a modulator connected to the channel coder for converting the verifiable digital signal to an analog signal. Finally, the apparatus includes a transmitter connected to the modulator for transmitting the analog signal along the DC power line.

16 Claims, 3 Drawing Sheets

VOICE, MUSIC, VIDEO AND DATA TRANSMISSION OVER DIRECT CURRENT WIRES

This is a continuation of U.S. patent application Ser. No. 08/185,711, filed Jan. 24, 1994 abn.

FIELD OF INVENTION

A system for transmission and reception of a combination of voice, music, video and data over noisy channels such as Direct Current (DC) circuits, using digital communication techniques is presented.

There is a modulator operating at a high frequency range. The concepts of channel coding technique, modulation and frequency takes into account the properties of the information to be transmitted and the channel to be used, such as conductivity and noise pattern.

BACKGROUND OF THE INVENTION

Voice, music, video and data communication or transfer are generally made using different channels. There are often used dedicated wires for each one of these signals. The novel system (as well as a method) transmit all of the signals over a single line, preferably one existing already for power distribution. When using an existing DC power supply line, there is required special handling of the information to be transmitted or received. The novel system reduces the number, cost, size and weight of the cables to be installed. It enables an easy installation and simplifies the interconnectivity of different types of subsystems and elements within the novel system.

SUMMARY OF THE INVENTION

There is provided a novel system of information transmission, where the term "information" includes voice transmission, music transmission and transmission of data and images, by means of high frequency signals, the transmission being via DC power lines. In the specific case, the DC power lines extending from the power generator to various instruments, such as sound generation elements like power amplifier, information generating appliances etc, are also used for the transmission and reception of such information at a high frequency.

According to a preferred embodiment there are combined voice, music, video and data transmission over one and the same electric DC power circuit, with adapted error correction techniques, for each one of the different types of signals.

For example, schematically a system of the invention, adapted to be connected to an existing power circuit of a mobile unit comprises in combination a receiver connected via a demodulator to a channel decoder, with a modulator connected via a transmitter on the one side of said channel coder, and on the other, with the mobile unit electrical DC circuit. The channel coder/decoder is connected to a voice module, a music module, a video module and a data module.

The above description of the basic features of systems of the invention, are by way of explanation of such principles.

The invention is illustrated by way of example with reference to the enclosed schematical block diagrams, in which.

Figure 1:
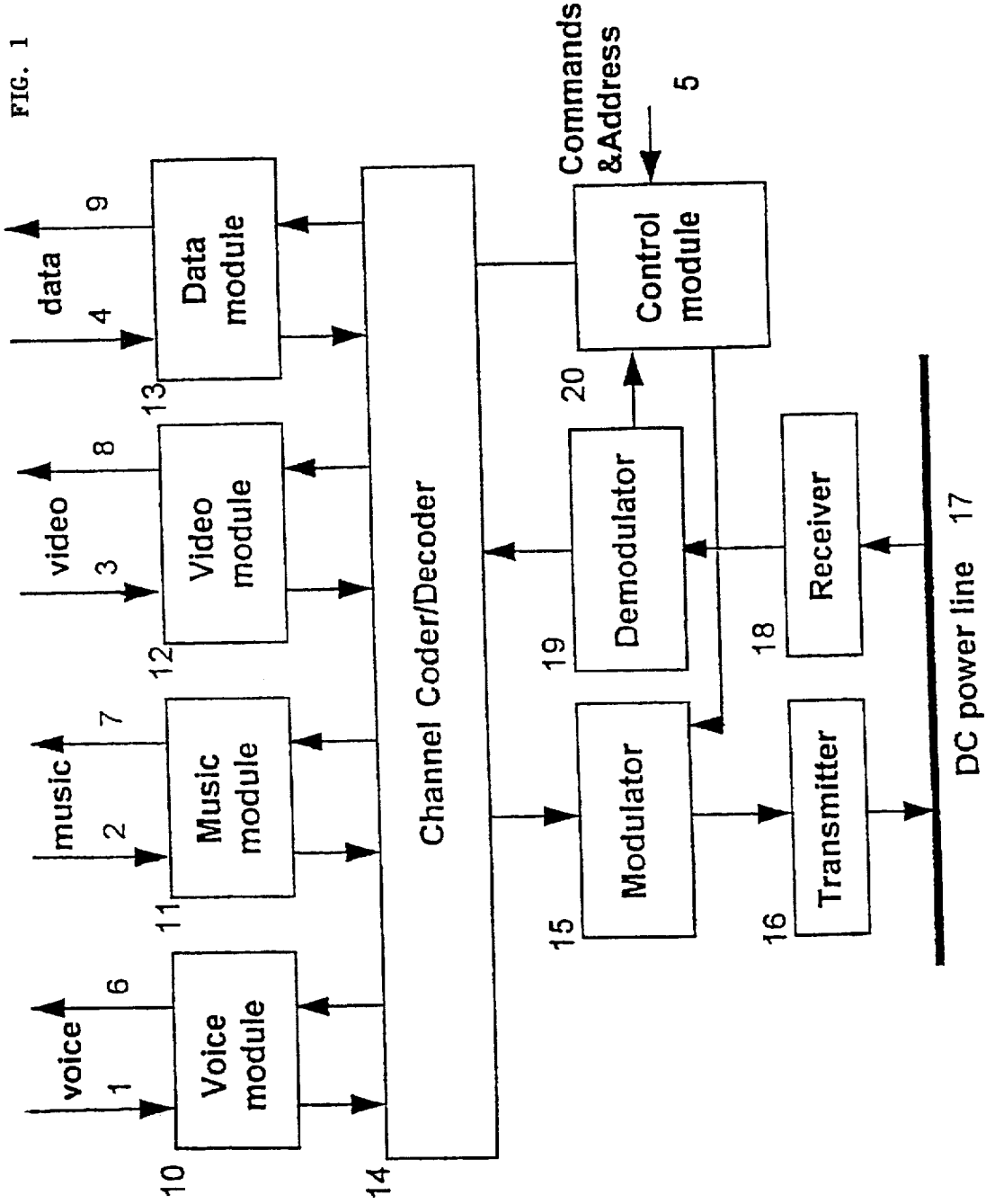
FIG. 1 is a block diagram of a system of the invention.

The DC communication system comprises units described in FIG. 1. Voice (1), music (2), video (3) and data (4) signals are applied to a channel coder (14) through an interface modules (10–13). Each of the modules has a flexible and adaptable handling to meet different types of communication standards i.e. PCM voice coder, digital input and outputs of Digital Audio Tape (DAT), and also interfaces for non-standard devices. Channel coder (14) provides error protection to the bits gathered from the interface modules (10–13). Each one of the input signals is protected with its own error correction means. Modulator module (15) converts the digital signal into an analog one. The Transmitter module (16) converts the signal to a high frequency form, at frequencies dependent on the channel used and modulation technique used, which signal is conducted to the DC power line (17). In the receive path, the signal is converted from high frequency to a baseband signal in the Receiver (18), then converted into bits through the Demodulator (19). Errors in the bit stream are detected and corrected in the Channel decoder (14). The appropriate data is transferred to each of the Interfaces modules (10–13) and then sent to the appropriate outputs of voice (6), music (7), video (8), data (9) according to its selected interface standard. Control module (20) detect the timing for "receive" and "transmit" paths according to tile channel activity, the applied system commands and addresses (5) of the system. The system can operate also in a multi device environment.

EXAMPLES

Figure 2:
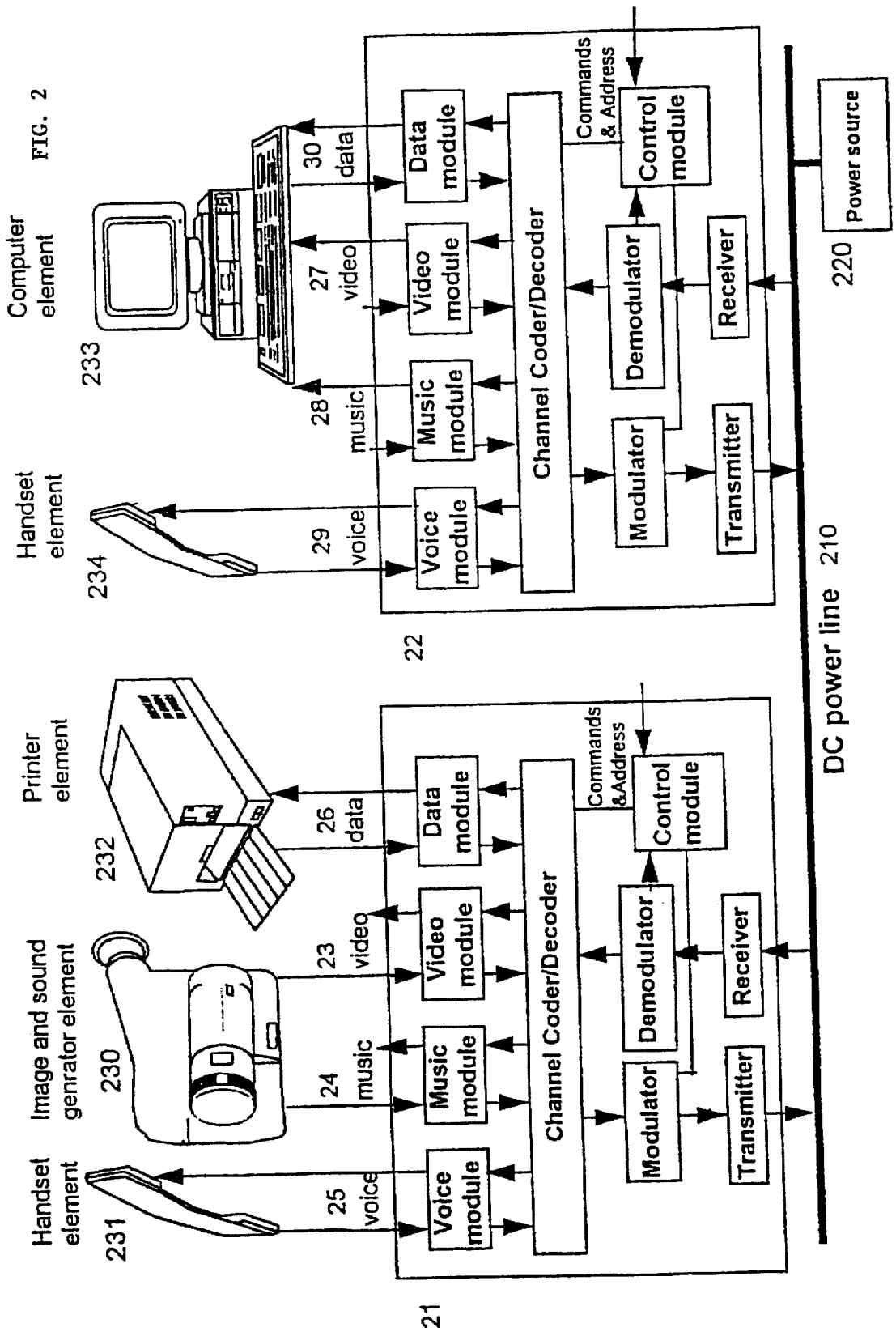
FIG. 2 is a block diagram of a model of implementation of a DC communication system in an office applied to the us of a DC power line.

One implementation of the invention has been realized using Digital Signal Processor (DSP) and support circuitry. In FIG. 2 there are two systems, each implements the system described in FIG. 1. Image and sound generator element (230) is connected with DC communication (DC-Com.) system (21) through the video (23) and music (24) inputs. An handset element (231) is connected to the voice input and output (25). A printer element (232) is connected to the data output(26). A computer element (233) which comprises of monitor unit is connected to DC communication system (22) through video output (27) and music output (28). The computer element sends digital information to the data input (30). An handset element (234) is connected to voice input and output (29). Both DC communication systems (21 and 22) are connected to a DC power line. Full duplex voice communication is performed between the DC communication systems (21 and 22). Image and sound from the image and sound generator (230) is transferred to DC communication system (21) where it is coded, modulated and transmitted using the DC power line (210), to DC communication system (22) where it is received, demodulated, decoded, and then transferred through the video and music modules to output (27) and output (28). Both outputs connected to the computer element (233). Information is transferred from the computer element to the data input (30) of DC communication system (22), where it is coded, modulated, and transmitted through the DC power line (210), to the DC communication system (21), where it is received, demodulated, decoded and transferred through data module output (26) to a printer element (232).

Figure 3:
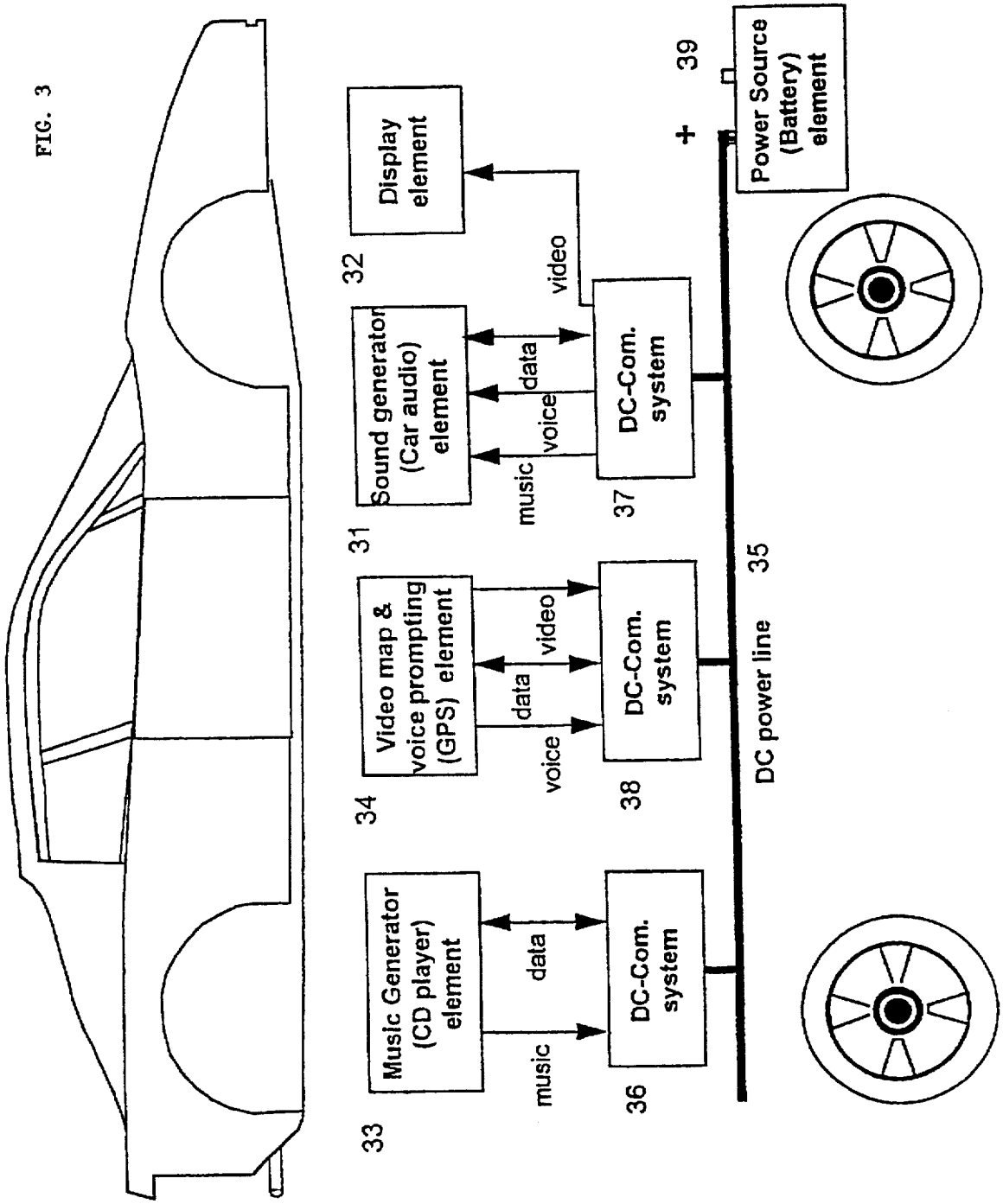
FIG. 3 is a block diagram of a model of implementation of the DC communication system in a mobile unit applied to the use of existing DC power line.

Additional example is illustrated in FIG. 3. A mobile unit having a sound generator element (31), a display element (32), a music generation element (33), a video map and voice prompting generator element (34). All are installed at different locations of the mobile unit. The inter-connection between the elements is performed using existing conventional DC power line (35) connected to power source element (39). The music from music generation element (33) is transmitted to the sound generation and control element (31) via the "transmit" path of the DC communication (DC-Com.) system (36) to the DC power line (35) and is received through the "receive" path of the DC Communication system (37). Video map and Voice prompting generator element (34) is transmitted using DC Communication system (38), the DC power line (35), DC communication system (37) to the Sound generator element (31). The received video signal from the DC-Communication system (37) is connected to the nearby Display element (32).

What is claimed is:

1. An apparatus for the transmission of information along a noisy DC power line, the apparatus comprising:

(a) one or more interface modules, each of said interface modules providing at least one interface for receiving a high bit-rate digital information signal corresponding to a human voice, music, or a video;

(b) a channel coder connected to said one or more interface modules for processing said high bit-rate digital information signals to produce a verifiable digital signal which includes information for performance of an error correction to compensate for background noise;

(c) a modulator connected to said channel coder for converting said verifiable digital signal to an analog signal; and (d) a transmitter connected to said modulator for transmitting said analog signal along the DC power line.

2. The apparatus of claim 1, wherein said one or more interface modules include:

(a) a first interface module for receiving a first high bit-rate digital information signal corresponding to a first one of said human voice, music, or a video; and (b) a second interface module for receiving a second high bit-rate digital information signal corresponding to a second one of said human voice, music, a video, or a data transmission.

3. The apparatus of claim 2, wherein said channel coder processes said first high bit-rate digital information signal for the performance of a first error correction technique, and wherein said channel coder processes said second high bit-rate digital information signal for the performance of a second error correction technique different from said first error correction technique.

4. The apparatus of claim 1, further comprising:

(a) a receiver for receiving an incoming analog signal;

(b) a demodulator for converting said incoming analog signal into a received digital signal; and (c) a channel decoder for detecting and correcting errors in said received digital signal.

5. The apparatus of claim 1, further comprising a receiver for receiving said analog signal from the noisy DC power line, said receiver including:

(a) a demodulator for converting said analog signal into a received digital signal, and (b) a channel decoder for detecting and correcting errors in said received digital signal to generate a reliable reproduction of said high bit-rate digital information signal.

6. The apparatus of claim 1, wherein said transmitter transmits said analog signal along a DC power circuit of a mobile unit.

7. The apparatus of claim 1, wherein said transmitter transmits said analog signal along a DC power circuit of a toy.

8. The apparatus of claim 1, wherein said transmitter transmits said analog signal along a DC power circuit of a home appliance.

9. The apparatus of claim 1, wherein said transmitter transmits said analog signal along a DC power circuit of an item of office equipment.

10. An apparatus for recovering high bit-rate digital information corresponding to a human voice, music, or a video, transmitted as an analog signal along a noisy DC power line, the apparatus comprising:

(a) a receiver for receiving the analog signal from the DC power line;

(b) a demodulator connected to said receiver for converting the analog signal to a high bit-rate digital signal;

(c) a channel decoder connected to said demodulator for performing error correction to detect and correct errors in said high bit-rate digital signal thereby generating a verified digital signal containing the high bit-rate digital information; and (d) one or more interface modules connected to said channel decoder, each of said interface modules providing at least one interface for outputting said verified digital signal.

11. The apparatus of claim 10, wherein said channel decoder processes said high bit-rate digital signal to generate two of said verified digital signals, a first of said verified digital signals being supplied to a first of said one or more interface modules, and a second of said verified digital signals being supplied to a second of said one or more interface modules.

12. The apparatus of claim 11, wherein said channel decoder performs a first error correction technique on said first verified digital signal and a second error correction technique on said second verified digital signal, said first error correction technique being different from said first error correction technique.

13. The apparatus of claim 10, wherein said receiver receives said analog signal from a DC power circuit of a mobile unit.

14. The apparatus of claim 10, wherein said receiver receives said analog signal from a DC power circuit of a toy.

15. The apparatus of claim 10, wherein said receiver receives said analog signal from a DC power circuit of a home appliance.

16. The apparatus of claim 10, wherein said receiver receives said analog signal from a DC power circuit of an item of office equipment.

* * * * *